(12) United States Patent
Briese et al.

(10) Patent No.: US 8,698,631 B1
(45) Date of Patent: Apr. 15, 2014

(54) SYSTEM AND METHOD FOR MAYDAY, ROLLCALL AND PERSONNEL ACCOUNTABILITY

(71) Applicant: Systems Definition, Inc., Alexandria, VA (US)

(72) Inventors: Frank Dean Briese, Silver Spring, MD (US); Brendan Lloyd Adams, Sterling, VA (US); Dale Gregory Meisenbach, Alexandria, VA (US)

(73) Assignee: Systems Definition, Inc., Alexandria, VA (US)

( * ) Notice: Subject to any disclaimer, the term of this patent is extended or adjusted under 35 U.S.C. 154(b) by 0 days.

(21) Appl. No.: 14/059,110

(22) Filed: Oct. 21, 2013

Related U.S. Application Data

(60) Provisional application No. 61/802,019, filed on Mar. 15, 2013.

(51) Int. Cl.
*G08B 13/14* (2006.01)
*G06K 7/00* (2006.01)

(52) U.S. Cl.
CPC .................................. *G06K 7/0008* (2013.01)
USPC ................ 340/572.1; 340/572.4; 340/539.13; 340/990; 455/405; 455/456.1

(58) Field of Classification Search
CPC .................................................... G06K 7/0008
USPC ...................... 340/572.4, 539.13, 990, 572.1; 455/405, 456.1
See application file for complete search history.

(56) References Cited

U.S. PATENT DOCUMENTS

| | | | |
|---|---|---|---|
| 5,793,882 A | 8/1998 | Piatek et al. | |
| 7,034,678 B2 | 4/2006 | Burkley et al. | |
| 7,091,852 B2 | 8/2006 | Mason et al. | |
| 7,652,571 B2 | 1/2010 | Parkulo et al. | |
| 7,996,465 B2 | 8/2011 | Cromp et al. | |
| 8,013,739 B2 | 9/2011 | Parkulo et al. | |
| 2002/0008625 A1 | 1/2002 | Adams | |
| 2002/0080032 A1* | 6/2002 | Smith et al. | 340/572.1 |
| 2005/0165616 A1 | 7/2005 | Ellis et al. | |
| 2006/0211404 A1* | 9/2006 | Cromp et al. | 455/405 |
| 2007/0184851 A1* | 8/2007 | Barnwell et al. | 455/456.1 |

(Continued)

OTHER PUBLICATIONS

FieldSoft, Inc., FieldSoft Interfaces to Other Systems, http://www.fieldsoft.com/interfaces.html, downloaded Mar. 12, 2013.
Grace Industries, Inc., InCommand, http://www.graceindustries.com/index.php/public-safety-acountability-systems/65-incommand, downloaded Mar. 12, 2013.
MSA, MSA Accountability System, 2011.
ERT Systems, LLC, On-Scene Accountability, date unknown.

(Continued)

*Primary Examiner* — Daniel Wu
*Assistant Examiner* — Israel Daramola
(74) *Attorney, Agent, or Firm* — Law Office of Oliver Edwards LLC; Oliver Edwards

(57) ABSTRACT

A system and method are disclosed for applying multi-layered identification techniques to associate live fireground Asset information (e.g., handheld radio messages, breathing apparatus status data) to identify incident personnel and provide graphical, prioritized Rollcall, personnel accountability, and emergency alert reporting to incident commanders and other personnel. In one aspect, the system may capture, display, and store routine and emergency alerting messages and data received at incidents from handheld radios and other Assets, associate that information with other data to specifically identify first responder personnel, and provide an automated and prioritized Rollcall and personnel accountability report based on received transmissions. The system has applicability for fire departments and fireground usage, as well as other first responders, military personnel operations, and other organizations needing to account for on-scene personnel.

21 Claims, 4 Drawing Sheets

(56) References Cited

U.S. PATENT DOCUMENTS

| | | |
|---|---|---|
| 2008/0084334 A1* | 4/2008 | Ballew .................... 340/990 |
| 2008/0150724 A1* | 6/2008 | Richards ................ 340/572.4 |
| 2012/0264394 A1 | 10/2012 | Miller |
| 2013/0265155 A1* | 10/2013 | Wible et al. ............ 340/539.13 |

OTHER PUBLICATIONS

Incident Response Technologies, Inc., Rhodium Incident Management Suite, http://www.irtsoftware.com/Incident_Management_Features.html, downloaded Mar. 12, 2013.

Systems Definition, Inc., Enhanced Fireground Accountability Solutions, 2011.

* cited by examiner

FIG. 3

SYSTEM AND METHOD FOR MAYDAY, ROLLCALL AND PERSONNEL ACCOUNTABILITY

This application claims priority to U.S. Provisional Application No. 61/802,019, filed Mar. 15, 2013, the contents of which are hereby incorporated in their entirety.

BACKGROUND OF THE INVENTION

1. Field of the Invention

The invention relates to a communications and safety systems in the field of tracking, displaying, and interacting with radio messages and Asset data on the fireground and having applicability to other First Responder personnel including Police and Emergency Medical Services (EMS) personnel.

2. Background of the Invention

Personnel safety is the number one concern for incident commanders on the fireground. Ensuring firefighter safety, accountability, and communications is crucial. Incident commanders must be able to quickly identify who is on the scene, the status of personnel, and the source and status of emergency alert messages.

The characteristics of the fireground have changed dramatically in recent years, with significant advancements in applying technologies and refining firefighting tactics. The introduction of personal hand-held radios for fireground personnel provides a crucial development in safety and accountability. Personal hand-held radios are used by nearly every modern fire department and are an integral component of fireground communications. This advancement provides firefighters with the ability to communicate with others outside their immediate physical vicinity. Additionally, some types of breathing apparatus gear worn by firefighters support the capability to transmit identification data and gear status data (e.g., level of remaining air in tank). RFID tags, sensors, and other technologies are also capable of transmitting digital signals with value for safety and accountability activities.

Although a significant improvement to fireground communications and accountability, the introduction of personal radios gave rise to new issues and safety concerns. One such issue is the treatment and processing of incoming emergency alert messages (sometimes referred to as Mayday messages). With radio networks established, it was possible to communicate among fireground personnel, and, depending on network design, between fireground personnel and dispatch centers. Emergency alert messages could be transmitted to involved parties, from incident commanders at the incident site to operators at the dispatch center. However, an active fireground is often a loud, confusing environment with many transmissions being sent simultaneously. This is especially true when an emergency alert message is transmitted and members use their radios to attempt to identify the originator and work to locate the originator. Often, this results in high-volume radio traffic.

Scenarios such as these may result in an incident commander being unable to reach the person in distress or having the emergency alert message "stepped on" before the sender can be identified. These situations have dire consequences when the originator of the emergency alert is unable to speak or to resend the emergency alert.

Another activity improved but not perfected through introduction of fireground radios was Personnel Accountability Reports ("PAR checks") and the related Rollcall function. A PAR check is a safety/accountability status verification usually performed at periodic intervals (e.g., every 10 or 15 minutes). A Rollcall is a personnel statusing and "head count" initiated by the incident commander to ensure members are accounted for and is often initiated after an emergency alert is transmitted.

Many departments rely on the incident commander to handle emergency alert messages sent from fireground personnel. The incident commander must identify the source of the message, determine status and location if possible, and implement procedures to rescue the firefighter in distress. Some departments, depending on radio network configuration and department procedures, use the department dispatch center to collect emergency messages and then relay this information to the incident commander on the fireground.

Nearly all U.S. fire departments implement a Rapid Intervention Team (RIT) capability such that one or more organizational Units at the incident are "held back" in order to be prepared to search for and rescue downed firefighters during fire suppression efforts. In one particular department, it was found that incoming emergency alert ("Mayday" messages) were handled by a single person on the fireground assigned to the Firefighter Assist and Search Team (FAST), the department's equivalent of the RIT capability. Equipped with a hand-held radio (with a small display window) as well as pen and paper, this Member was assigned to monitor the radio display screen to await any incoming Mayday messages. When/if that message arrived, the designated Member would then copy the numeric radio identification information associated with the transmission in order to identify the source. This identification process included using hardcopy paper printouts to "map" an identification number to a specific Unit and Assignment (e.g., Engine 325 Nozzle position).

Beside the fact of the above being a manual, paper-based process, a major flaw in this method was that any other incoming radio messages would "step on" (e.g., overwrite) the original Mayday message and the observer would lose the radio information from the display before the source could be properly identified. As Mayday messages are many times accompanied with a flood of incident radio traffic, the loss of the Mayday message originator identification is a common occurrence.

In many fire departments, the incident commander will initiate a Rollcall to account for fireground personnel following transmission of an emergency alert message. A Rollcall is a personnel count initiated by the incident commander to ensure Member are accountability. Conducting a Rollcall via traditional procedures is often a lengthy process, involving the incident commander attempting to contact each individual person, or even requiring all personnel to physically relocate to report for a head count. These procedures consume valuable time that is in short supply when managing an emergency situation where an emergency alert has been transmitted and a Member is in distress.

These procedures prove to be especially cumbersome and ineffective for large scale operations, such as warehouse fires or high-rise fires. These situations often have sustained, high-volume radio traffic and sometimes hundreds of personnel on the fireground, making emergency alert identification and Rollcall processing very time consuming, difficult, and subject to inaccuracies.

No current system is available that provides a comprehensive, yet simple means of displaying radio traffic and other Asset data, associating it with fireground personnel, and allowing incident commanders to manage emergency alerts and initiate Rollcalls and PAR checks.

What is needed is a system that provides a comprehensive, yet simple means of displaying radio traffic and other Asset data, associating it with fireground personnel, and allowing incident commanders to manage emergency alerts and initiate Rollcalls and Personnel Accountability Report (PAR) checks.

SUMMARY OF THE INVENTION

According to one embodiment of the present invention, there is provided a computer implemented method for fireground accountability having a step of maintaining an asset electronic identification/member association table on a computer-readable medium. The table contains asset electronic identification records for at least two types of assets and each member is associated with asset electronic identifiers. There is also a step of maintaining on the computer readable medium a role association table associating each member with a unit or an assignment. There is a further step of monitoring asset communications transmitted on a communications channel for asset communications, where asset communications contain an asset electronic identifier and an optional communication payload. There are also steps of retrieving a member identity from the asset electronic identification/member association table based on an asset electronic identifier in a monitored asset communication, retrieving a unit or an assignment from the role association table based on the member identity and displaying the member identity and unit or assignment on a computer display.

According to another embodiment of the present invention, there is provided a tangible computer readable medium containing computer program instructions for instructing a computer to carry out a fireground accountability process having a step of maintaining an asset electronic identification/member association table on a computer-readable medium. The table contains asset electronic identification records for at least two types of assets. Each member is associated with asset electronic identifiers. There are also instructions for maintaining on the computer readable medium a role association table associating each member with a unit or an assignment. There are also instructions for monitoring asset communications transmitted on a communications channel for asset communications, where asset communications contain an asset electronic identifier and an optional communication payload. There are also instructions for retrieving a member identity from the asset electronic identification/member association table based on an asset electronic identifier in a monitored asset communication, retrieving a unit or an assignment from the role association table based on the member identity and displaying the member identity and unit or assignment on a computer display.

In another embodiment, a system for fireground accountability is provided, the system including a computer having digital storage for storing computer program instructions and data and a display and an RF modem configured to receive and demodulate RF digital transmissions of assets and transmit the demodulated transmissions to the computer. The computer program instructions are configured to instruct the processor to maintain an asset electronic identification/member association table in the digital storage wherein the table contains asset electronic identification records for at least two types of assets and each member is associated with one or more asset electronic identifiers. The instructions are further configured to instruct the computer to maintain in the digital storage a role association table associating each member with at least a unit or an assignment. The instructions are further configured to instruct the computer to monitor the demodulated transmissions for asset communications, said asset communications comprising an asset electronic identifier and an optional associated communication payload and retrieve a member identity from the asset electronic identification/member association table based on an asset electronic identifier in a monitored asset communication. The instructions are further configured to instruct the computer to retrieve a unit or an assignment from the role association table based on the member identity and display the member identity and unit or assignment on the display.

In some embodiments, members may be selected having an assignment and associated with selected units and for each selected member, a tag displayed for the member in a first distinctive manner on the computer display. The display may be updated for the tag for a particular member in a second distinctive manner in response to an asset communication associated with the particular member. The display may be updated for the tag for a particular member in a third distinctive manner in response to an asset communication associated with the particular member indicating a mayday.

In some embodiments, the at least two types of assets are radio and SCBA.

BRIEF DESCRIPTION OF THE DRAWINGS

This disclosure is made with reference to the following drawings, in which like features are represented by common reference numbers.

FIG. 3 illustrates an exemplary status and deployment display according to embodiments of the invention.

DETAILED DESCRIPTION

Figure 1:
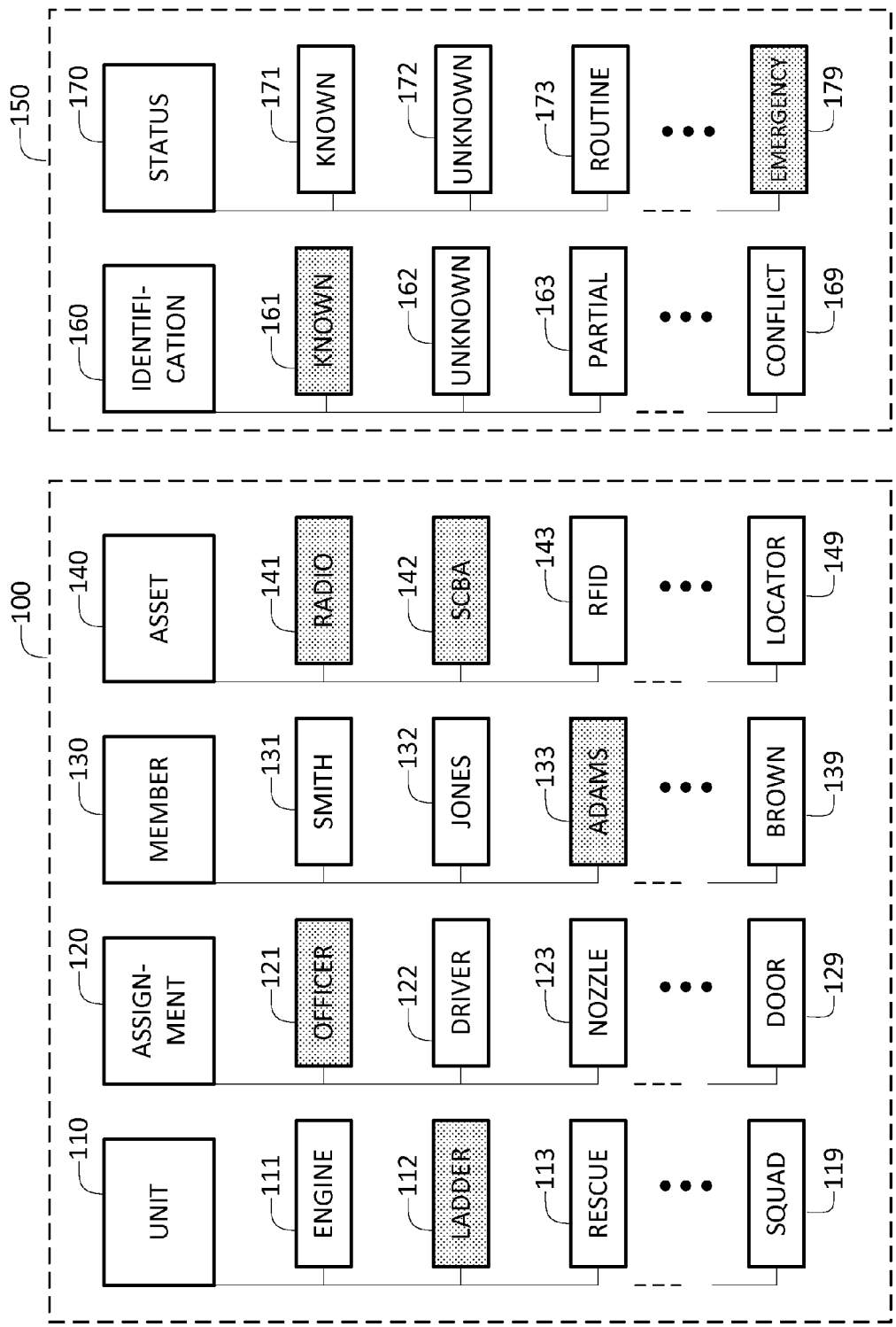
FIG. 1 illustrates a multi-layered identification approach with status information.

Embodiments of the present invention address the deficiencies described above by supporting firefighter safety and accountability through the use of multi-layered identification techniques and automated graphical accountability capabilities for use on the fireground during incidents. Multi-layered means several data types are used to match different, seemingly unrelated pieces of data, to identify the Member they all have in common.

Embodiments of the present invention may employ multi-layered identification techniques to associate and identify personnel and Assets using representations for organizational Units (e.g., Engine 12), Assignments (e.g., Nozzle position), Member (specific firefighter name), and Asset (radio ID #123, breathing apparatus #345). In embodiments of the invention:

All Assignments may be accounted for regardless of being staffed by a Member or having Assets;

All Members may be accounted for regardless of holding Assets and all Assets may be accounted for regardless of being assigned to Members or Units;

Member identification and association to Assets may be established even if only partial data is available; and Assignments, Members, and Assets may be accounted for simultaneously if their data agree.

Embodiments of the invention may employ an Automated Graphical Accountability (AGA) capability that leverages the multi-layered identification techniques to group and graphically display organizational Units. These data displays may consist of color-coded and labeled representations of the Unit/Assignment/Member/Asset being accounted for during an incident. Representations can range from one data element being present up to cases where all/multiple data elements match-up entirely to form full identification and accountability.

For example, the multi-layered identification techniques and graphical color coding functions enable the incident commander to quickly see if a Member has transmitted a message (e.g., identifying and color coding that message as routine or emergency alert), if a Member needs to be accounted for (e.g., no response during Rollcall), if a Member does not need to be accounted for (e.g., the Unit/Assignment is not staffed for the incident and as such there is no Member present), and a Member who has been successfully accounted for (e.g., positive response to Rollcall request for accounting).

Member accounting and denoting of emergency alert messages may be accomplished through automated receipt of electronic messages/data from an Asset or by manual incident commander interaction.

Embodiments of the invention may be implemented using widely available computer and communications resources and may be deployed in command vehicles or in portable units that can be carried to the incident and deployed on-site.

A purpose of some embodiments of the invention is to support firefighter safety and accountability through multi-layered identification techniques and automated, graphical accountability capabilities for use on the fireground during incidents by the incident commander. Embodiments of the present invention are operable to:

Ingest and process organizational and incident-generated data to automatically assist Member identification;

Capture, display, and save incoming routine and emergency alert messages and other relevant data from Assets;

Initiate and display Rollcall showing graphical representation of status of Members present on the fireground; and Check-in with the incident commander by keying their radio push-to-talk (PTT) button.

Embodiments of the present invention may interface with organizational data including scheduling systems and datasets to aggregate and associate this data for Unit/Assignment/Member/Asset identification and provide status on the fireground.

Embodiments of the present invention may employ multi-layered identification techniques to associate and identify personnel using representations for organizational classes such as Units, Assignments, Member, and Asset information. In this manner, Member identification and association to Assets may be established with only partial data availability. FIG. 1 illustrates a multi-layered identification using an instantiation of a sample identification and status outcome.

For the example shown in FIG. 1, there are organizational department elements 100 and identification and status elements 150. Within the organizational department 100 elements there are main classes Unit 110, Assignment 120, Member 130 and Asset 140. The Unit class 110 may include elements such as Engine 111, ladder 112, Rescue 113, Squad 119 and others. The Assignment class 120 may include elements such as Officer 121, Driver 122, Nozzle 123, Door 129 and others. The Member class 130 may have personnel identification elements such as a family name. Exemplary names Smith 131, Jones, 132, Adams 133 and Brown 139 are illustrated. An Asset class may contain elements such as Radio 141, SCBA 142, RFID 143, Locator 149 and others.

Identification and status elements 150 may include an identification class 160 and a status class 170. With in the identification class 160, there may be elements Known 161, Unknown 162, Partial 163 and Conflict 169. Within the status class 170, there may be elements Known 171, Unknown 172, Routine, 173, Emergency 179 and others.

With continuing reference to FIG. 1, Unit Ladder 112 may be associated with the Assignment Officer 121 for Member Adams. The Assets reporting are Radio 141 and SCBA 142. With this available and integrated data, the identification and outcomes are processed to Known 161 and Emergency 179, indicating that an emergency alert was triggered either automatically by the Asset reporting or by manual setting by the incident commander. In this scenario, the system rapidly makes a positive identification of a Member who is in an emergency situation and makes this easily and overtly known to the incident commander via the display GUI. This scenario illustrates the tremendous improvement over traditional, cumbersome processes, especially those utilizing manual pen and paper approaches.

Figure 2:
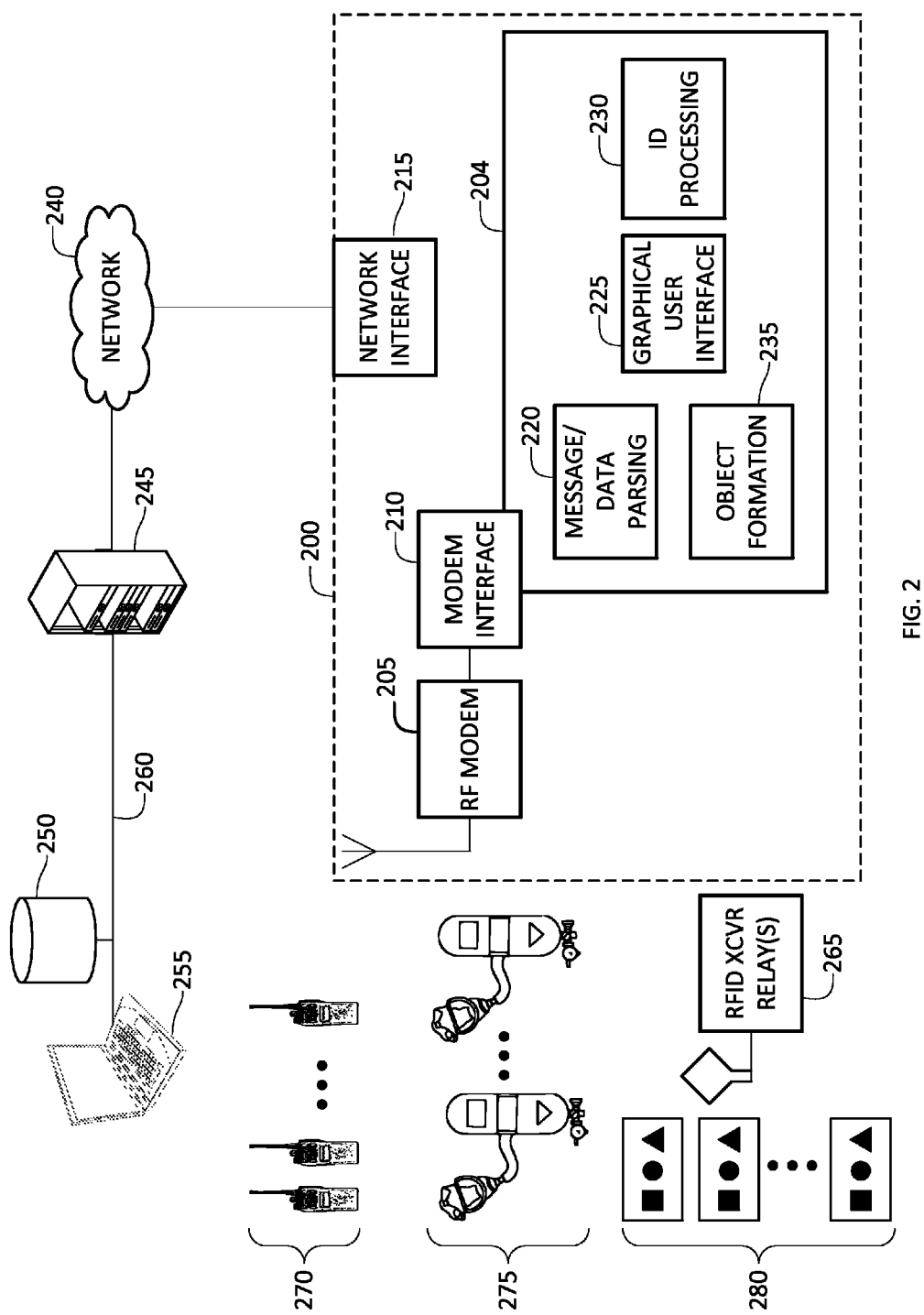
FIG. 2 illustrates system deployment aspect of an embodiment of the invention.

FIG. 2 illustrates a system deployment diagram. A command subsystem 200 may include a computer 204, network interface 215, an RF modem interface 210, an RF modem 205, and software stored on a tangible computer readable medium (not shown) which, when executed by the computer provides for message/data parsing 220, object formation 235, ID processing 230 and providing a graphical user interface 225. Subsystem 200 can be installed in, for example, command vehicles and transportable cases. Subsystem 200 can interface with department Assets such as radios 270, SCBAs 275 and a tag system, such as an RFID tag system comprising RFID tags 280 and one or more RFID transceiver relays 265. Personnel data may be obtained through wireless modems. In the subsystem 200, computer 204 may be connected to RF modem 205 through interface 210. Incoming incident Asset/radio traffic on the fireground is received by the modem and relayed to the computer 204 and application software running on the computer. The application software is configured to process the data and create displays based on the data on a screen of the computer (not shown) via GUI 225.

Figure 3:
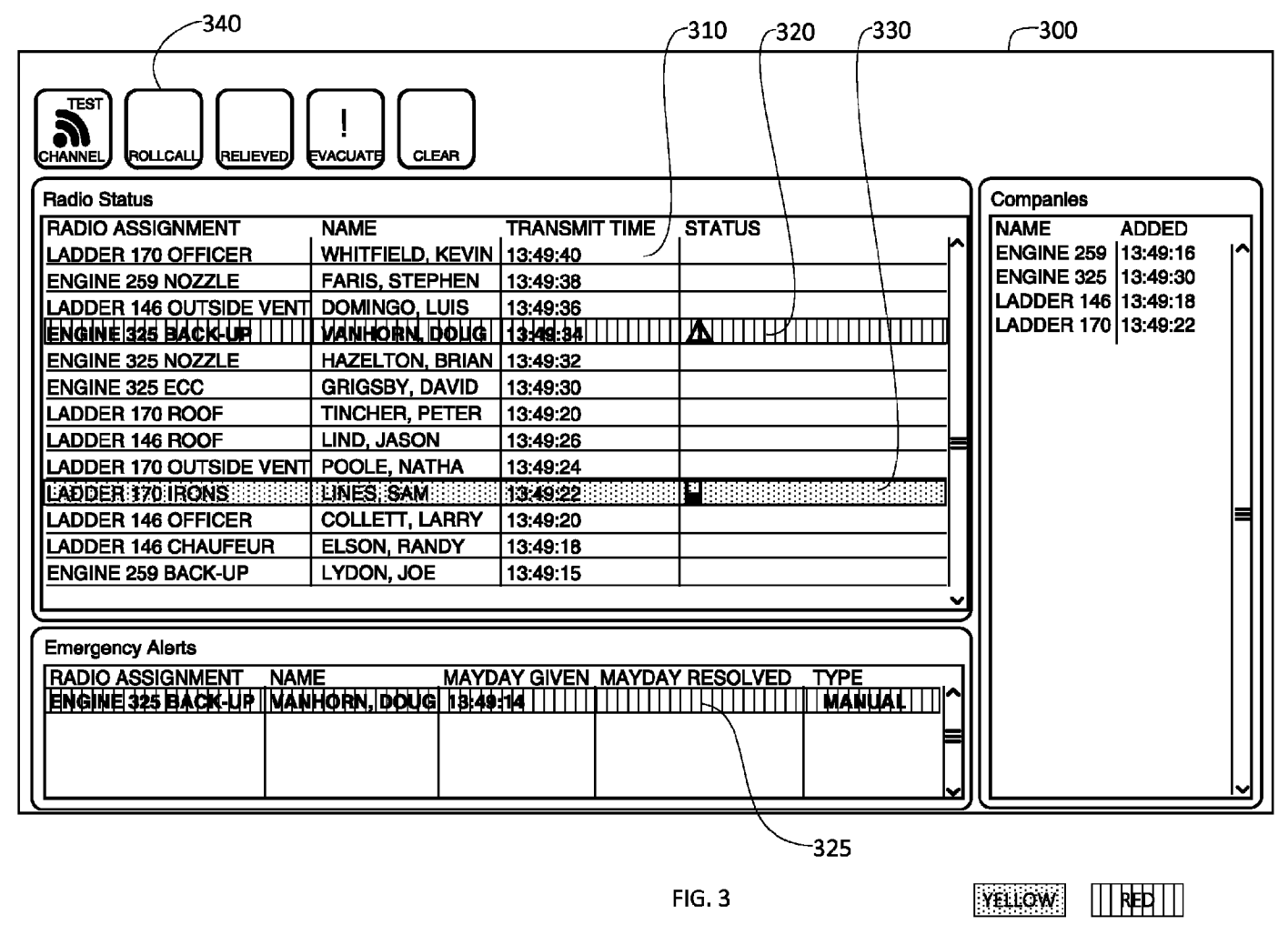

With reference to FIG. 3, in one embodiment of the invention, the GUI 225 may display an interactive list of routine and emergency alert transmissions such as those illustrated in exemplary display screen 300. Routine messages such as the entry at reference 310 are handled as non-highlighted, time-sorted entries on the list. In the event an emergency alert message is transmitted, the system captures the message from the modem and displays the message, e.g., references 320 and 325, on the computer screen. The information displayed may include the Unit identifier, Assignment name, Member name, Asset identifier, transmit time, emergency alert type, and other related data. Received emergency alert messages are indicated and highlighted in a designated area of the display separate from other routine radio transmissions, e.g. reference 325. The system saves all emergency alert data, even after alert resolution, to support accountability and for post-incident review.

In FIG. 3, the Member with the emergency alert may be highlighted in red as shown by references 320 and 325 to highlight a potentially life-threatening problem. A Member with a low-air tank level may be highlighted in yellow as shown by reference 330 as a warning. It is not deemed an emergency yet, but the Member may be either pulled out of the hot zone before air level becomes a problem or the incident commander may notify the Member to closely monitor air level. Aspects of the invention application provide useful, actionable data to assist with fireground accountability and emergency alerting.

Figure 4:
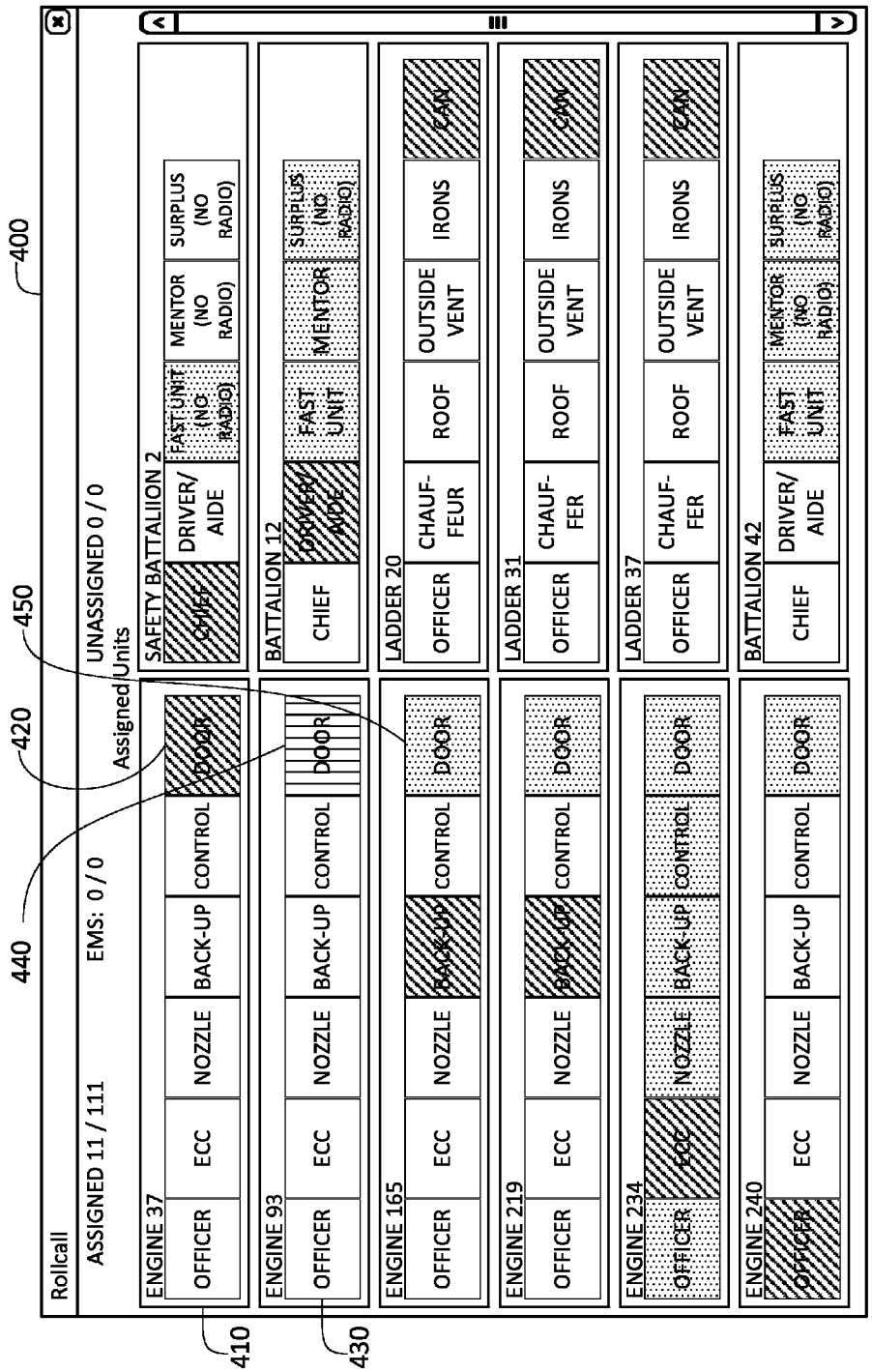
FIG. 4 illustrates an exemplary rollcall graphical user interface according to aspects of the invention.

Some embodiments of the invention provide for Personnel Accountability Report (PAR) checks and conducting of a Rollcall. The Rollcall feature may be activated through the GUI by selecting a particular GUI control, such as button 340 illustrated in FIG. 3. FIG. 4 is an exemplary GUI display 400 of the PAR and Rollcall aspect of the GUI. PAR checks are routine accountability checks performed at appropriate intervals during the incident (e.g., every 15 minutes). Rollcall events are often initiated after an emergency alert message is received or a major event occurs at the incident (e.g., an explosion, roof collapse, etc.) and serve as a means for personnel on the fireground to check-in with the incident commander.

When a Rollcall is initiated by the incident commander, aspects of the invention automatically generate a required list of personnel 410 to account for by Unit and Assignment. All personnel on the fireground are notified that a Rollcall is underway and check-in is required. To check-in for the Rollcall, personnel key their radios by pressing the PTT button. Responses via keyed radios are captured and shown in green on the GUI such as illustrated by reference 420. Members not yet responding, but present on the fireground, are shown by yellow color-coding such as illustrated by reference 430. A Member associated with an emergency alert status is highlighted in red color such as illustrated by reference 440. Members not present on the fireground or present but with no radio are shown in gray color such as illustrated by reference 450.

Embodiments of the present invention provide for tracking of Rollcall progress and continually updating GUI display 400. In this way, the incident commander can ensure that all Members are accounted for. In the case where a Member does not report in, their information is highlighted in GUI display 400, identifying the non-reporting Member.

In some embodiments of the invention there is the ability to interface with existing department personnel/radio data and personnel scheduling software. For example, the department may have, referring to FIG. 2, a departmental network 260, storage 250, server 245 and one or more computers 255. Such resources may store an Asset/SCBA dataset, an Incident Dispatch dataset and a Member schedule/Tour Roster dataset. By connecting through the network 240, and collecting data from these datasets, identification techniques may be applied to associate currently working Members with radio identification numbers. For example, by interfacing with the department schedule/tour dataset and Incident Dispatch dataset, it can be determined which Units are assigned to an incident. From there, specific Members may be associated with radios based on the current work schedule and radio identification numbers from the department data. Such datasets may be retrieved by broadband communications through network interface 215 as well as over other networks, including available radio networks.

While various embodiments of the present invention have been described above, it should be understood that they have been presented by way of example only, and not limitation. Thus, the breadth and scope of the present invention should not be limited by any of the above-described exemplary embodiments. Moreover, any combination of the above described elements in all possible variations thereof is encompassed by the invention unless indicated herein or otherwise clearly contradicted by context.

What is claimed is:

1. A computer implemented method for fireground accountability comprising:
    maintaining an asset electronic identification/member association table on a computer-readable medium wherein the table contains asset electronic identification records for at least two types of assets and each member is associated with one or more asset electronic identifiers;
    maintaining on the computer readable medium a role association table associating each member with at least a unit or an assignment;
    monitoring asset communications transmitted on a communications channel for asset communications, said asset communications comprising an asset electronic identifier and an optional associated communication payload;
    retrieving a member identity from the asset electronic identification/member association table based on an asset electronic identifier in a monitored asset communication;
    retrieving a unit or an assignment from the role association table based on the member identity;
    displaying the member identity and unit or assignment on a computer display.

2. The computer-implemented method of claim 1, wherein the at least two types of assets are radio and Self-Contained Breathing Apparatus (SCBA).

3. The computer-implemented method of claim 1, further comprising the step of displaying the member identity in a distinctive manner when an associated communication payload is included and the payload meets a pre-selected criterion.

4. The computer-implemented method of claim 3, wherein the distinctive manner is a red-highlighting when the payload indicates a member mayday and a yellow-highlighting when the payload indicates a low-air tank level.

5. The computer-implemented method of claim 1, further comprising steps of:
    selecting members having an assignment and associated with selected units;
    for each selected member, displaying a tag for the member in a first distinctive manner on the computer display;
    updating the display for the tag for a particular member in a second distinctive manner in response to an asset communication associated with the particular member;
    updating the display for the tag for a particular member in a third distinctive manner in response to an asset communication associated with the particular member indicating a mayday.

6. The computer-implemented method of claim 5, wherein the list of selected members is organized by unit.

7. The computer-implemented method of claim 6, wherein the selected members' assignments or names are displayed.

8. A system for fireground accountability comprising:
    a computer having digital storage for storing computer program instructions and data and a display; and
    an RF modem configured to receive and demodulate RF digital transmissions of assets and transmit the demodulated transmissions to the computer;
    wherein the computer program instructions are configured to instruct the processor to carry out steps of:
        maintaining an asset electronic identification/member association table in the digital storage wherein the table contains asset electronic identification records for at least two types of assets and each member is associated with one or more asset electronic identifiers;
        maintaining in the digital storage a role association table associating each member with at least a unit or an assignment;
        monitoring the demodulated transmissions for asset communications, said asset communications comprising an asset electronic identifier and an optional associated communication payload;

retrieving a member identity from the asset electronic identification/member association table based on an asset electronic identifier in a monitored asset communication;

retrieving a unit or an assignment from the role association table based on the member identity;

displaying the member identity and unit or assignment on the display.

9. The system of claim 8, wherein the at least two types of assets are radio and Self-Contained Breathing Apparatus (SCBA).

10. The system of claim 8, wherein the computer program instructions further comprise instructions for instructing the computer to carry out a step of displaying the member identity in a distinctive manner when an associated communication payload is included and the payload meets a pre-selected criterion.

11. The system of claim 10, wherein the distinctive manner is a red-highlighting when the payload indicates a member mayday and a yellow-highlighting when the payload indicates a low-air tank level.

12. The system of claim 8, wherein the computer program instructions further comprise instructions for instructing the computer to carry out steps of:

selecting members having an assignment and associated with selected units;

for each selected member, displaying a tag for the member in a first distinctive manner on the display;

updating the display for the tag for a particular member in a second distinctive manner in response to an asset communication associated with the particular member;

updating the display for the tag for a particular member in a third distinctive manner in response to an asset communication associated with the particular member indicating a mayday.

13. The system of claim 12, wherein the list of selected members is organized by unit.

14. The system of claim 13, wherein the selected members' assignments or names are displayed.

15. A non-transitory computer readable medium containing computer instructions for fireground accountability, said medium containing instructions for instructing a computer to:

maintain an asset electronic identification/member association table on a computer-readable medium wherein the table contains asset electronic identification records for at least two types of assets and each member is associated with one or more asset electronic identifiers;

maintain on a computer storage a role association table associating each member with at least a unit or an assignment;

monitor asset communications transmitted on a communications channel for asset communications, said asset communications comprising an asset electronic identifier and an optional associated communication payload;

retrieve a member identity from the asset electronic identification/member association table based on an asset electronic identifier in a monitored asset communication;

retrieve a unit or an assignment from the role association table based on the member identity;

display the member identity and unit or assignment on a computer display.

16. The computer readable medium of claim 15, wherein the at least two types of assets are radio and Self-Contained Breathing Apparatus (SCBA).

17. The computer readable medium of claim 15, further comprising instructions for instructing the computer to display the member identity in a distinctive manner when an associated communication payload is included and the payload meets a pre-selected criterion.

18. The computer readable medium of claim 17, wherein the distinctive manner is a red-highlighting when the payload indicates a member mayday and a yellow-highlighting when the payload indicates a low-air tank level.

19. The computer readable medium of claim 15, further comprising computer instructions for instructing the computer to:

select members having an assignment and associated with selected units;

for each selected member, display a tag for the member in a first distinctive manner on the computer display;

update the display for the tag for a particular member in a second distinctive manner in response to an asset communication associated with the particular member;

update the display for the tag for a particular member in a third distinctive manner in response to an asset communication associated with the particular member indicating a mayday.

20. The computer readable medium of claim 19, wherein the list of selected members is organized by unit.

21. The computer readable medium of claim 20, wherein the selected members' assignments or names are displayed.

* * * * *